Sept. 26, 1967  W. E. KEMP ET AL  3,343,886
HOPPER STRUCTURE

Filed March 1, 1965  4 Sheets-Sheet 1

INVENTORS
WILLARD E. KEMP
CARL E. BECKER
BY *Eugene N. Riddle*
ATTORNEY

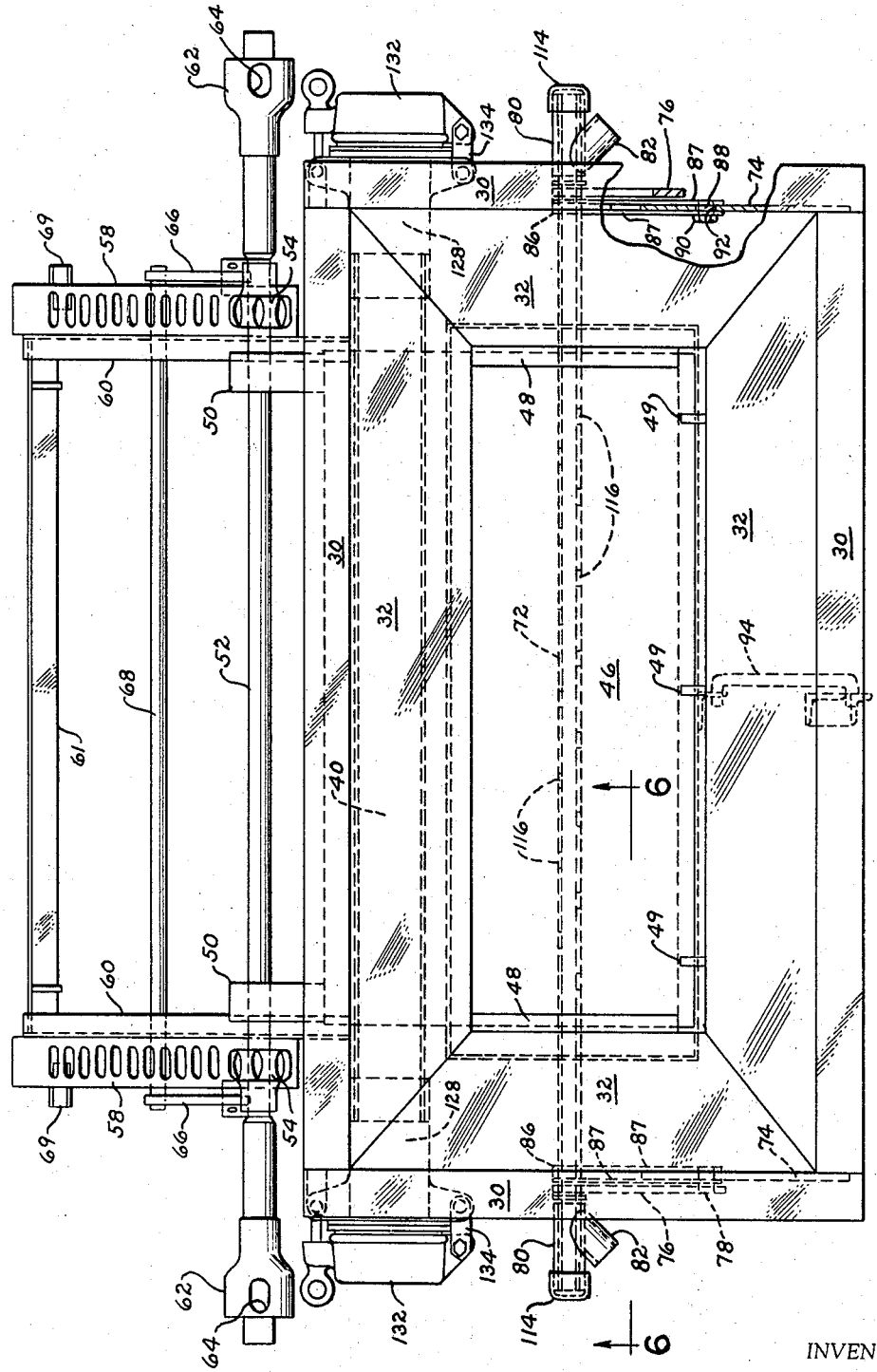

Sept. 26, 1967 W. E. KEMP ETAL 3,343,886
HOPPER STRUCTURE
Filed March 1, 1965 4 Sheets-Sheet 4

INVENTORS
WILLARD E. KEMP
CARL E. BECKER
BY *Eugene N. Riddle*
ATTORNEY

United States Patent Office 3,343,886
Patented Sept. 26, 1967

3,343,886
HOPPER STRUCTURE
Willard E. Kemp, Bridgeton, Carl E. Becker, St. Louis, Mo., assignors to ACF Industries, Incorporated, New York, N.Y., a corporation of New Jersey
Filed Mar. 1, 1965, Ser. No. 435,971
14 Claims. (Cl. 302—52)

This invention relates to hopper structures and more particularly to a hopper outlet structure which permits the unloading of material either pneumatically or by gravity.

As shown in copending application Ser. No. 385,998 filed July 29, 1964, now Patent No. 3,248,026 issued Apr. 26, 1966, the entire disclosure of which is incorporated by this reference, a hopper structure is disclosed in which a movable cover is provided beneath a bottom discharge gate to protect the area beneath the gate from foreign matter and the like when the gate is closed. In the transporting and unloading of finely-divided materials, and particularly food stuffs, such as flour, sugar, and the like, it is necessary that no foreign matter or accumulation of moisture be permitted to contact and possibly contaminate the material from the area beneath the gate as the material is being unloaded. Normally, a circumferential housing or frame extends downwardly from the gate to define the discharge opening so that a suitable discharge chute or the like may fit about the discharge opening to receive the material when the gate is opened and the material is unloaded. If the interior of the housing beneath the gate is not covered or protected in some manner when the gate is closed, moisture or foreign matter may be deposited on the interior surface of the housing and upon subsequent unloading deposited foreign matter will, at least to a certain degree, be entrained in the material being unloaded.

It has been found to be advantageous to pneumatically unload the finely-divided material from the space or area formed between the sliding gate and the bottom cover since a highly effective cleanout of the outlet structure is provided by such an arrangement. By unloading pneumatically from the area between the slidable gate and cover, a high velocity airstream is provided adjacent the leading edge of the gate which forms an entrance restriction to a pneumatic discharge conduit. After a major portion of the material within the hopper structure has been unloaded, the movement of the gate across the upper surface of the cover presents a high velocity airstream moving along such surface and the material which remains on the surface of the lower bottom cover is effectively removed to obtain a maximum cleanout of the outlet structure.

One of the problems in pneumatic unloading material is the tendency for fine powders to pack and slug in the pneumatic system because the material when not fluidized will not flow readily through the small openings into the pneumatic tube or discharge conduit for removal. While some unloading arrangements have provided means heretofore for fluidizing various areas of a hopper, these prior means do not keep the material in a fluidized state throughout its movement from the bottom of the hopper to the vacuum discharge conduit. The material therefore has a tendency to repack in areas where there is no fluidization which results in an uneven and inefficient conveying operation.

With some materials, it is advantageous to provide additional means to aerate or fluidize the material on the bottom cover as it is being unloaded pneumatically. Such aeration will assure an even and uniform conveying action into a pneumatic discharge conduit from the space between the cover and sliding gate. The present invention is particularly adaptable for the unloading of bulk pulverulent materials which are not free flowing and are capable of being fluidized, such as, for example, flour, soda ash, carbon black, cement, bicarbonate of soda, kaolin clay, and starch. This invention comprises the provision of a gas permeable member on the upper surface of the sanitary shield or bottom cover whereby air may flow from a plenum chamber through the permeable member to aerate or fluidize the finely-divided material immediately above the cover adajcent the discharge conduit thereby to prevent a bridging of the material in that area.

Since the upper surface of the bottom cover is gas permeable, a gas flow therethrough is permitted to prepare the material for an efficient pneumatic transport to the pneumatic discharge conduit in a substantially even and uniform conveying action. Further, the permeable member is disposed immediately adajcent the discharge passageway into the penumatic tube or conduit over substantially the entire upper surface of the lower cover. Thus, the material is substantially completely fluidized when it enters the pneumatic conduit which will assure an even and uniform conveying action without packing or bridging.

For each bulk material there is a critical outlet opening over which the material will not bridge, and if the outlet opening is made sufficiently large then the bulk material should unload properly. However, with a permeable member that covers substantially the entire upper surface of the bottom cover, it is possible to discharge material through a relatively small passageway leading to the discharge conduit thereby resulting in a more efficient structure for unloading finely-divided materials. The upper face of the permeable membrane is generally equal in area to the gravity discharge opening when the gate is open and is aligned vertically with such gravity discharge opening. Thus, the present outlet structure will discharge any material capable of being fluidized which will pass the opening at the gravity gate. For finely-divided materials that are fluidized, this has the effect of making the effective size of the pneumatic discharge opening the same as the gravity discharge opening at the gravity gate with any material being discharged pneumatically that will pass the opening at the gate.

It is an object of this invention to provide an outlet structure which may discharge finely-divided material either by gravity or pneumatically with the pneumatic discharge capability of the outlet not affecting the capability of the outlet to discharge by gravity.

A further object of this invention is the provision of such an outlet structure in which the material is discharged pneumatically from the area between a discharge gate and a movable bottom cover into a pneumatic discharge conduit in a substantially uniform and even conveying action without any bridging over or packing of the material being discharged into the pneumatic conduit.

An additional object of this invention is the provision of such an outlet structure in which the discharge passageway leading to the penumatic discharge conduit may be of minimum dimensions while maintaining a substantially even and uniform conveying action.

Another object of this invention is the provision of a detachable bottom cover carrying a permeable member which may be removably connected to the bottom of an outlet structure for pneumatic unloading and removed after pneumatic unloading.

The invention accordingly comprises the constructions hereinafter described, the scope of the invention being indicated in the following claims.

In the accompanying drawings, in which several of various possible embodiments of the invention are illustrated, FIGURE 1 is an elevational view of a railway hopper car having a plurality of bottom outlet structures comprising the present invention;

FIGURE 5 is a top plan view of the bottom outlet structure of FIGURES 2-4 showing the gate and bottom cover in closed position;

Figure 1:
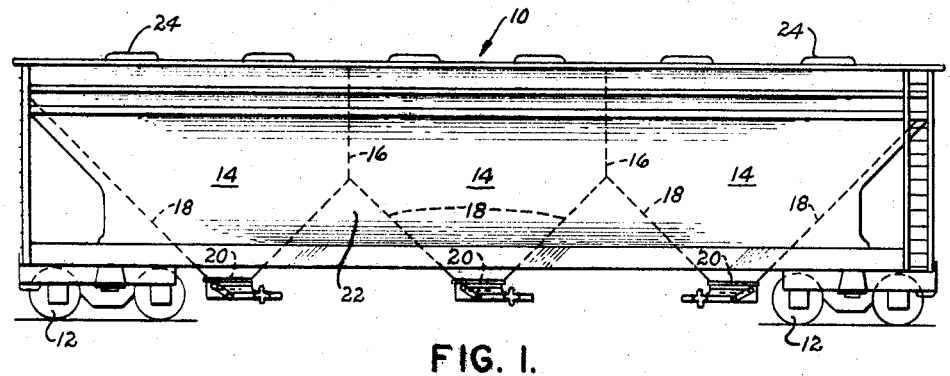

Referring to the drawings for a better understanding of our invention and more particularly to FIGURE 1, a covered hopper car is indicated generally at 10 and has a truck assembly 12 at each end. Car 10 has a plurality of hopper structures or hoppers 14 separated by bulkheads or partitions 16. Hopper end sheets 18 funnel downwardly to form bottom discharge openings 20 with hopper side sheets 22. Hatch covers 24 open into hoppers 14 to permit loading car 10.

Figure 2:
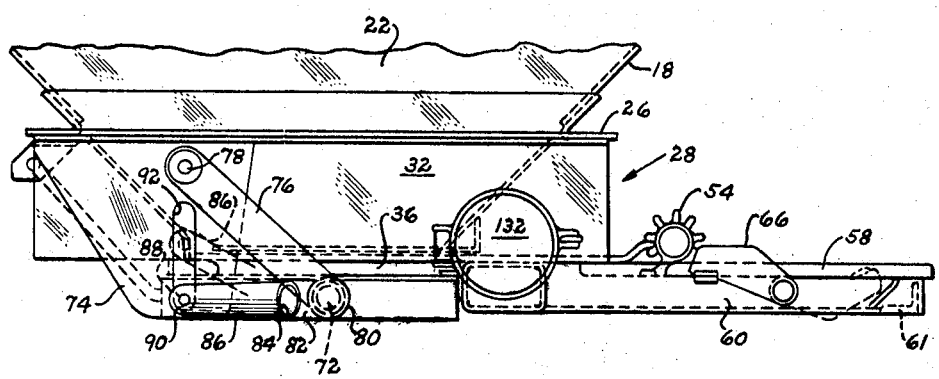
FIGURE 2 is an enlarged elevation of a bottom outlet structure shown in FIGURE 1 attached beneath a hopper structure.
Figure 3:
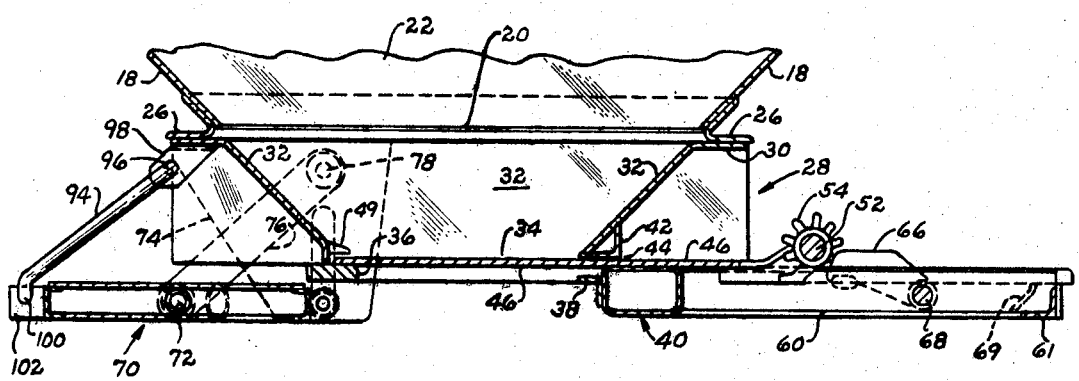
FIGURE 3 is a sectional view of the outlet structure shown in FIGURE 2 with a bottom cover in an open stored position to permit a gravity discharge of material from the bottom outlet structure.
Figure 4:
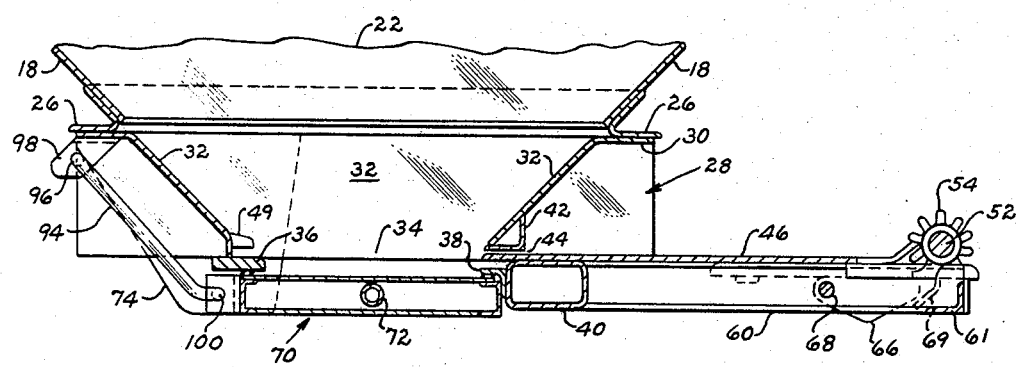
FIGURE 4 is a sectional view similar to FIGURE 3 but showing the bottom cover in closed position with the discharge gate open to permit a pnuematic discharge of finely-divided material.

Extending around the periphery of each opening 20 is an outwardly extending flange 26 as shown in FIGURES 2-4. Secured to flange 26 of each hopper structure 14 by suitable means, such as by welding, is a bottom outlet structure indicated generally at 28. Each outlet structure 28 is identical and comprises a housing having an upper peripheral flange 30 adapted to fit against flange 26 as shown in FIGURES 2, 3, 4 and 6, a lower generally rectangular supporting frame, and outlet slope sheets 32 connected to each other between upper flange 30 and the lower rectangular frame to form a generally rectangular bottom opening 34. Forming three sides of the generally rectangular frame beneath opening 34 are bars 36 of a rectangular cross section. An angle 38 beneath one the slope sheets 32 forms a portion of the remaining side of the rectangular frame.

Figure 6:
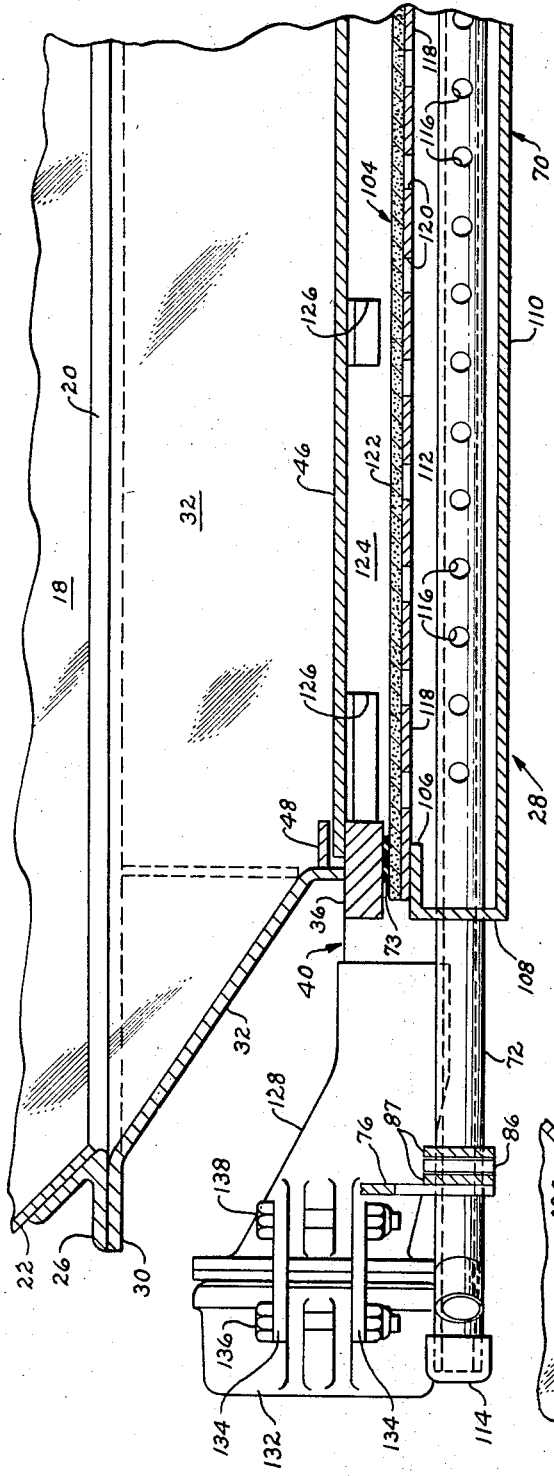
FIGURE 6 is a section taken generally along line 6—6 of FIGURE 5.

Lower angle 38 is secured, such as by welding, to a portion of the remaining side of the rectangular frame beneath opening 34 as well as forming a material discharge conduit, as will be explained more fully. Tubular member 40 has a flat upper surface and is of a non-circular cross section, such as a generally rectangular cross section. An upper reinforcing angle 42 is secured, such as by welding, to the adjacent slope sheet 32 and is spaced from tubular member 40 to form a gate slot 44 therebetween as shown in FIGURE 4. Mounted for sliding movement within the slot 44 along the flat upper surface of tubular member 40 and bars 36 is a gate 46. A flange 48 on a pair of opposite slope sheets 32 forms a side retaining guide strip for gate 46 as it moves along bars 36 as shown in FIGURES 5 and 6.

Spaced end lugs 49 secured to slope sheet 32 opposite gate slot 44 position gate 46 in the closed position thereof as shown in FIGURES 3 and 5.

A pair of spaced arms 50 extend rearwardly from gate 46 as shown in FIGURE 5 and form bearing supports for pinion shaft 52. A pinion 54 adjacent each end of shaft 52 has teeth engaging an associated rack 58. Racks 58 are secured, such as by welding, to channel members 60 which support gate 46 for movement to open position. A cross brace 61 extends between the rear end of channel members 60. A capstan 62 on each end of shaft 52 has suitable openings 64 therein to permit a spike or the like to be inserted for rotating shaft 52 and pinions 54. Rotation of pinions 54 which are in alignment with racks 58 open and close gate 46.

To hold gate 46 in closed position, a stop lever 66 is mounted on each end of a shaft 68 supported on channel members 60. Stop levers 66 may be swung against supports 69 on racks 58 as shown in FIGURE 4 to permit opening of gate 46.

Mounted beneath gate 46 and fitting against the rectangular frame formed by bars 36 and lower angle 38 is a bottom cover or cover structure generally designated 70. Cover 70 is supported on a hollow rod or shaft 72 which extends beyond each end of the cover. A suitable gasket 73 (see FIGURE 6) is positioned between cover 70 and the rectangular frame. A hanger plate 74 is secured to each end slope sheet 32 and extends downwardly as shown in FIGURES 2 and 5. A hanger or link arm 76 adjacent each end of rod 72 is pivotally mounted at its upper end about pin 78 secured to the adjacent hanger plate 74 and slope sheet 32. Rod 72 is pivotally carried by the lower end of each arm 76 for supporting cover 70 and rod 72 in suspended relation for swinging movement between open and closed positions.

Fixed to each end of rod 72 is a hub 80 having an outwardly projecting tubular end 82 with an opening 84 adapted to receive a handspike or the like for rotating rod 72 and swinging cover 70 between open and closed positions. Fixed to rod 72 adjacent each hub 80 is a link 86 bifurcated to form link arms 87 which receive hanger plate 74 as shown in FIGURES 2 and 5. A roller 88 mounted between the link arms for rotation on pin 90 fits within a slot 92 in hanger plate 74. Slot 92 extends in a generally vertical direction and roller 88 moves up and down in slot 92 as cover 70 moves between open and closed positions.

To maintain cover 70 generally flat or level as it moves between open and closed positions, a bar 94 is pivotally connected at 96 to a downwardly extending projection 98 on the underside of flange 30. The lower end of bar 94 is pivotally connected at 100 to a lug 102 carried by cover 70. Bar 94 forms with hanger arm 76 a parallelogram linkage and maintains the axes of cover 70 oriented during movement thereof upon rotation of shaft 72. Link 86 releasably locks cover 70 in closed position as shown in FIGURE 2 and in open stored position as shown in FIGURE 3. When roller 88 is positioned adjacent the bottom of slot 92, the pivot formed by pin 90 is below the pivot formed by shaft 72 carrying cover 70. Thus, the weight of cover 70 acting through shaft 72 urges roller 88 downwardly to the bottom of slot 92 thereby to releasably lock cover 70 in the closed position and in the open stored position. Hanger arms 76 are freely mounted about shaft 72 and suspend cover 70 for movement between open and closed positions.

To open cover 70 for gravity unloading, a handspike or the like is inserted in opening 84 and shaft 72 is rotated in a clockwise direction viewing FIGURE 2. Since link 86 is fixed to shaft 72, the extending end of link 86 is first moved upwardly to a broken line position indicated in FIGURE 2 with roller 88 being swung above the level of rod 72 so that the weight of cover 70 urges link 86 and roller 88 upwardly in slot 92 and cover 70 falls away from the bottom of outlet structure 28. Further rotation of hub 80 and shaft 72 moves cover 70 to the position of FIGURE 3. With cover 70 in the position of FIGURE 3, pinion shaft 52 may be rotated to open gate 46 as shown in FIGURE 3 thereby to permit a gravity discharge of material from railway car 10. After unloading, gate 46 is closed and cover 70 is swung to closed position upon rotation of hub 80 and shaft 72 in a counterclockwise direction from the position of FIGURE 3. For further details of the operation of cover 70, reference is made to copending application S.N. 429,475 of Carl E. Becker filed Feb. 1, 1965, and entitled Hopper Structure, the entire disclosure of which is incorporated by this reference.

Referring particularly to FIGURES 4 and 6 and constituting an important feature of this invention, cover or cover structure generally designated 70 carries an upper permeable member generally designated 104 secured, such as by welding, to inturned flanges 106 on upturned edges 108 of cover 70. Permeable member 104 forms with main plate 110 of cover 70 a plenum chamber 112. A suitable source of air, not shown, may be connected to hollow shaft 72 from either side of car 10. A removable cap 114 on each end of hollow shaft 72 may be removed for connection of shaft 72 to the source of air. Shaft 72 extends through plenum chamber 112 and has apertures 116 opening into plenum chamber 112 to permit an air flow from hollow shaft 72. If desired, suitable air seals may be employed between shaft 72 and cover 70 to permit relative rotation of shaft 72 without air loss. Permeable member 104 has a substantially rigid metal backing plate or base 118 with a plurality of openings 120 therein. A permeable membrane 122 is secured, such as by a thermosetting adhesive or by sintered bonding, to base 118. Membrane 122 is formed of a fiber metal material in which metallic fibers having a length to diameter ratio of at least 10 to 1, and as high as 2,000 to 1, are individually dispersed and felted to form a random, interlocked non-woven body. The non-woven body is then sintered under reducing conditions at a high temperature to produce welds or metallic diffusion bonds at interfiber contact points. The sintered fiber metal forming membrane 122 is relatively dense but yet is permeable to allow a generally uniform introduction of fluidizing air from plenum chamber 112. A permeability of around 10 has been found to be effective for unloading the bulk material in railway car 10. The term "permeability" is defined as "the amount of air measured in cubic feet and at 70° F. and 25% relative humidity which will pass through the area of one square foot of the membrane in one minute when tested under an equivalent pressure differential of two inches of water." A permeability of around 10 may be obtained by employing a membrane 122 of around 1/16 of an inch in thickness and a stainless steel base 118 of around 1/8 of an inch in thickness with apertures 120 including around 60% of the entire surface area of base 118.

Tubular conduit 40 forms a discharge passage for the pneumatic discharge of particles from a discharge chamber 124 formed between gate 46 and permeable member 104. Particles to be pneumatically unloaded pass from discharge chamber 124 through spaced slots 126 which form material passageways from chamber 124 to conduit 40. Conduit 40 extends along the length of gate 46 to form a discharge area along the entire length of the gate.

Gate 46 and permeable member 104 extend in parallel relation to each other and form chamber 124 of a generally uniform cross-sectional area which is of importance primarily during the cleanout of outlet structure 28 when gate 46 is moved across permeable member 104. The exposed edge of gate 46 forms an entrance restriction to chamber 126 and should have an air velocity of around five thousand (5000) feet per minute for effective cleanout. Air velocities between fifteen hundred (1500) feet per minute and eight thousand (8000) feet per minute have been found to be satisfactory dependent on the type of material being unloaded. Such cross-sectional area should be generally uniform along the width of permeable member 104 in order to provide a generally uniform air velocity as the gate moves across permeable member 104. To obtain such air velocities, discharge chamber 126 is formed of a uniform cross-sectional area not substantially exceeding ten (10) square inches per each one hundred (100) c.f.m. (cubic feet per minute) of air delivered. A cross-sectional area of around four (4) square inches for each one hundred (100) c.f.m. of air delivered has been found to be optimum. For example, a cross-sectional area of around fifty (50) square inches should not be exceeded when an air compressor having a capacity of around 500 c.f.m. (cubic feet per minute) is employed. Thus, if chamber 126 is of a length of around four (4) feet, the spacing between gate 46 and permeable member 104 should not substantially exceed one (1) inch. If an air compressor having a capacity of around one thousand (1000) c.f.m. is employed, the maximum cross-sectional area of chamber 126 adjacent conduit 40 should not substantially exceed one hundred (100) square inches. A maximum spacing between gate 46 and permeable member 104 should not substantially exceed two (2) inches for best results.

Referring to FIGURES 5 and 6, a transition section 128 is secured to each end of conduit 40. The inner end of transition section 128 adjacent conduit 40 is of a generally rectangular cross section. The outer opposite end of transition section 128 is circular in cross section and is adapted to fit a discharge suction hose or the like (not shown) for the conveyance of particles from car 10. An end cap 132 is provided around the outer end of each transition section 128. Links 134 pivotally connected by bolts 136 to end cap 132 and by bolts 138 to transition section 128 hold cap 132 in position. Car 10 may be unloaded from either side thereof upon removal of a selective end cap 132 from material discharge conduit 40.

Operation for the pneumatic discharge of particles is as follows:

The end cap 132 on the side of railway car 10 from which it is desired to unload is first opened and swung about pivots 136, 138 to open position. A suitable suction hose (not shown) is fitted on transition section 128 and a suitable suction, such as, for example, 500 cubic feet a minute (c.f.m.) is applied to exert a suction or vacuum on chamber 124 through slots 126. To fluidize the material over permeable membrane 122 to assure an even and uniform conveying action into pneumatic discharge conduit 40, an end cap 114 on hollow shaft 72 is removed and connected to a suitable air supply. Air flows into plenum chamber 112 through openings 116 and thence through openings 120 and permeable membrane 122 to fluidize the material being unloaded above permeable membrane 122 thereby assisting and preparing the finely-divided material for unloading. With bottom cover 70 closed, gate 46 is fully opened by rotation of capstans 62 to the position shown in FIGURE 4. In this position the material is unloaded until the particles adjacent at least a portion of slots 126 are removed to short circuit the air being drawn in from the end of conduit 40. At this unloading stage, a major portion of the material has been unloaded and it is only necessary to cleanout the bottom portion of the hopper as particles normally remain on the side of the hopper opposite conduit 40.

Permeable membrane 122 extends for the length of discharge chamber 124 and is directly adjacent openings 126 forming particle passageways into conduit 40. Thus, the material is substantially completely fluidized when it enters pneumatic conduit 40 and does not tend to pack or slug in discharge chamber 124. Slots 126 may be of any desired size and may be relatively small in view of the fluidization of the particles being unloaded. With some materials, a single slot 126 may extend the length of chamber 124, if desired.

In the pneumatic unloading of the material, the major portion of the material is removed when gate 46 is fully opened. However, a substantial amount of material remains supported on membrane 122 when the air is short circuited and passed from outlet structure 28 directly into tubular conduit 40 bypassing the material. For effecting cleanout, gate 46 is moved toward closed position across permeable membrane 122 at a relatively slow rate of speed which results in a high velocity airstream being presented at the leading edge of the gate to the material remaining on permeable membrane 122 thereby effectively removing the remaining material. Thus, a highly effective cleanout of outlet structure 28 is provided.

For the gravity unloading of material, bottom cover 70 is moved to open position as shown in FIGURE 3 by rotation of shaft 72 by a suitable handspike or the like inserted within tubular member 82 on the end of shaft 72. Shaft 72 may be actuated from either side of the railway car. Then, gate 46 is opened to allow the gravity discharge of material. Thus, the plenum chamber carried by cover 70 is moved away from the gravity discharge opening and does not interfere in any manner with the gravity discharge of material. The gravity gate support structure requires only a minimum of modification in order to be adapted for the pneumatic unloading of finely-divided particles.

Figure 7:
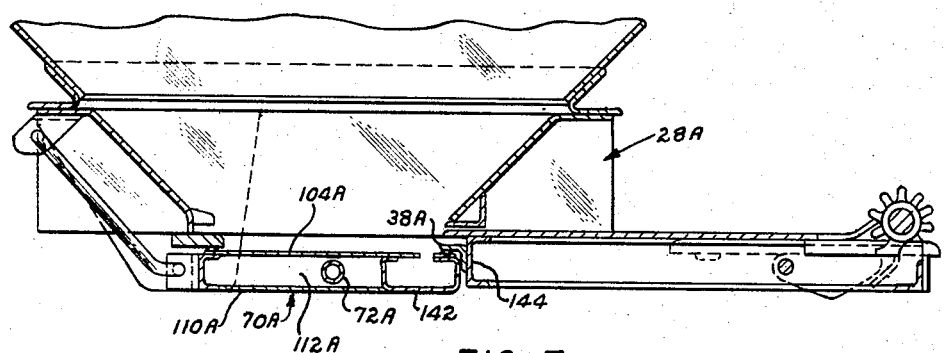
FIGURE 7 is a modification of the present invention in which the penumatic conduit is carried by the bottom cover.

Referring to FIGURE 7, a modified form of an outlet structure 28A is illustrated in which cover 70A carries a pneumatic discharge conduit 142 on the side thereof over which gate 46A moves between open and closed positions. Conduit 142 fits against angle 38A on channel 144 in the closed position thereof. Thus, the supporting frame for gate 46A does not have to be modified to receive a material discharge conduit since the discharge conduit is carried by and forms an integral part of cover 70A. Cover 70A is generally similar to cover 70 illustrated in FIGURES 2–6 except for material discharge conduit 142. A plenum chamber 112A is formed between permeable member 104A and bottom plate 110A. Air is supplied to plenum chamber 112A from hollow shaft 72A.

Figure 8:
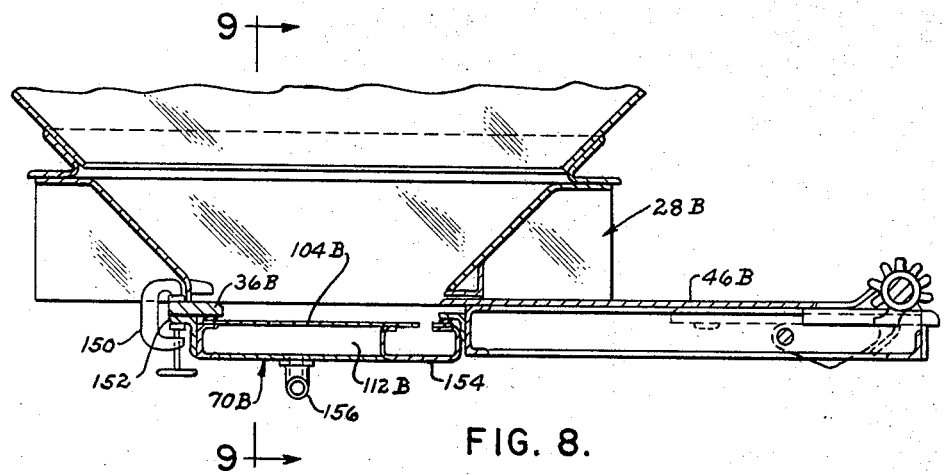
FIGURE 8 is a sectional view of a further modification of the present invention in which the bottom cover structure is detachable from the remainder of the bottom outlet structure to permit adaptation of a gravity discharge outlet for pneumatic discharge.
Figure 9:
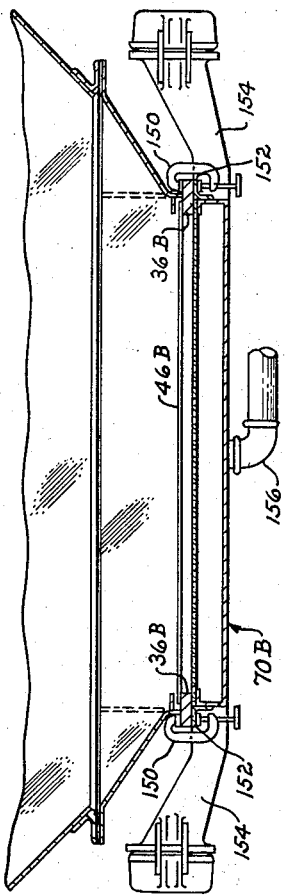
FIGURE 9 is a section taken generally along line 9—9 of FIGURE 8.

Referring to FIGURES 8 and 9, a further modification is illustrated in which a detachable bottom cover structure or removable fluidizing unit is indicated generally at 70B. To secure fluidizing unit to the underside of bottom outlet structure 28B, C-clamps 150 clamp an outwardly extending flange 152 of unit 70B to the underside of bars 36B forming the framework for supporting gate 46B. A pneumatic discharge conduit 154 is carried by unit 70B for the pneumatic discharge of particles. Air is supplied to plenum chamber 112B by an air inlet pipe 156 and a permeable member 104B similar to permeable member 104 in the embodiment of FIGURES 2–6 forms a part of unit 70B. Unit 70B may be employed to adapt a gravity discharge outlet for pneumatic discharge in a minimum of time. The unit may be easily clamped beneath a bottom outlet structure without any modification of the gravity outlet structure.

Figure 10:
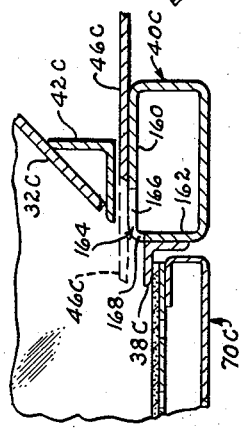
FIGURE 10 is a fragmentary sectional view of a modified pneumatic discharge conduit illustrating a modified slot arrangement.

Referring to FIGURE 10, a modified form of slot arrangement for the material discharge conduit is illustrated. A box-shaped pneumatic discharge conduit 40C is positioned to extend inwardly beyond the adjacent edge of slope sheet 32C and angle 42C and comprises a flat upper section 160 and a vertical inner section 162. Conduit 40C forms a part of the generally rectangular frame beneath gate 46C and supports gate 46C for movement between open and closed positions. Cover 70C fits against angle 38C secured to conduit 40C. Gate 46C moves back and forth along upper section 160. Spaced along the length of conduit 40C are a plurality of slots generally designated 164 which are formed at the juncture of sections 160 and 162 with a horizontal slot portion 166 being defined by section 160 and vertical slot portion 168 being defined by section 162. During the major portion of the unloading, gate 46C is in the position shown in solid lines in FIGURE 10 with horizontal slot portion 166 exposed. However, during the cleanout phase with gate 46C being moved toward a closed position as indicated in broken lines in FIGURE 10, horizontal slot portion 166 is covered and the effective size of opening 164 is the vertical dimension of slot portion 168. By decreasing the effective size of the slots during cleanout, the air velocity is increased and a more uniform distribution of air velocity is obtained along the length of discharge conduit 40C. For the major portion of unloading, the slots 164 are of increased size when the gate is fully opened thereby to obtain a relatively fast rate of discharge. The movement of gate 46C controls the effective size of slots 164 without the use of any separate controls.

In view of the above, it will be seen that the several objects of the invention are achieved and other advantageous results obtained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A bottom outlet structure for selectively discharging finely-divided material either by gravity or pneumatically and adapted to be secured beneath the bottom outlet of a hopper structure comprising, a gate slidable in opposite directions between open and closed positions relative to the bottom outlet, a housing including a supporting frame beneath the gate on which the gate is supported for sliding movement, a bottom cover beneath the gate forming with the frame and gate an enclosed space in closed position of the gate into which material flows upon opening of the gate, a pneumatic discharge conduit communicating with the enclosed space beneath the gate for removing pneumatically the finely-divided material from the area between the gate and cover, said bottom cover carrying an upper gas permeable member spaced from the cover to form a plenum chamber therebetween whereby air may flow from the plenum chamber through the gas permeable member to aerate the finely-divided material adjacent the upper surface of the gas permeable member, and means forming a connection between said housing and said cover for wholly supporting said cover from said housing, said means being releasable to permit movement of said bottom cover from beneath the gravity gate for allowing a gravity discharge of material upon opening of the gate.

2. A hopper outlet structure having sides funneling downwardly to a bottom discharge opening, an elongate cover beneath the bottom discharge opening, a rod extending longitudinally of the cover on which the cover is mounted for movement between open and closed positions relative to the bottom discharge opening, said rod being free to rotate relative to said cover and having an end portion extending beyond the cover on each end thereof, a separate linkage on the outlet structure operatively connected to each end portion of the rod and suspending the rod and cover in supporting relation, means to permit rotation of said rod for actuating the linkages and moving the cover between open and closed positions, and a pneumatic discharge conduit communicating with the area of the outlet structure above the cover for the pneumatic discharge of finely-divided material, said cover carrying an upper gas permeable member and having a plenum chamber beneath the gas permeable member whereby the air may flow from the plenum chamber through the gas permeable member to fluidize the finely-divided material adjacent the upper surface of the gas permeable member for transport to the pneumatic discharge conduit in a uniform and even conveying action.

3. A covered hopper railway car for selectively discharging finely-divided material either by gravity or pneumatically and having a plurality of hopper outlet structures arranged centrally of the width of the car to permit center unloading, each outlet structure having a bottom discharge opening and an elongate cover beneath the bottom discharge opening extending transversely of the width of the car, a rod extending longitudinally of the cover on which the cover is mounted for movement between open and closed positions relative to the bottom discharge opening, means suspending the rod and cover in supporting relation, a pneumatic discharge conduit extending generally transversely of the car and communicating with the area of the outlet structure above the cover for the pneumatic discharge of finely-divided material, said cover carrying a gas permeable member and a plenum chamber beneath the gas permeable member whereby gas may pass through the gas permeable surface into the finely-divided material to fluidize the material for transport to the pneumatic conduit, and means on each side of the railway car to actuate the rod and move the cover and rod between an open inoperative position to permit gravity discharge of material and a closed position to permit pneumatic discharge of material into the pneumatic conduit.

4. A covered hopper railway car for selectively discharging finely-divided material either by gravity or pneumatically and having a plurality of hopper outlet structures arranged centrally of the width of the car to permit center unloading, each outlet structure having an elongate cover beneath the bottom discharge opening extending transversely of the width of the car, a rod extending longitudinally of the cover on which the cover is mounted for movement between open and closed positions relative to the bottom discharge opening, means suspending the rod and cover in supporting relation, and a pneumatic discharge conduit extending generally transversely of the car and communicating with the area of the outlet structure above the cover for the pneumatic discharge of finely-divided material, said bottom cover carrying an upper gas permeable member over substantially its entire upper surface and having a plenum chamber beneath the gas permeable member whereby air may flow from the plenum chamber through the gas permeable member to fluidize the finely-divided material adjacent the upper surface of the gas permeable member for transport to the pneumatic discharge conduit in a generally uniform conveying action, said rod being hollow and in fluid communication with said plenum chamber whereby an air source may be connected to said rod for supplying air to said plenum chamber.

5. A covered hopper railway car as set forth in claim 4 wherein said hollow rod extends through said plenum chamber and a plurality of apertures in said rod communicate the interior of the rod with the plenum chamber to permit air flow from the rod to the plenum chamber.

6. A bottom outlet structure for selectively discharging finely-divided material either by gravity or pneumatically comprising sides funneling downwardly to a bottom discharge opening, a gate slidable in opposite directions between open and closed positions relative to the discharge opening, a supporting frame beneath the gate on which the gate is supported for sliding movement, a movable bottom cover beneath the gate forming with the frame and gate an enclosed space in the closed position of the gate into which material flows upon opening of the gate, a pneumatic discharge conduit communicating with the enclosed space beneath the gate for removing pneumatically the finely-divided material from the area between the gate and movable cover, said movable bottom cover having an upper gas permeable member along which the material moves to the pneumatic discharge conduit whereby air may pass through the gas permeable member into the finely-divided material, means supporting said cover from the outlet structure, and means to move said cover between an open inoperative position to permit gravity discharge of material and a closed position beneath the slidable gate to permit the pneumatic discharge of material from the space between the cover and gate into the pneumatic conduit.

7. Apparatus for selectively unloading finely-divided material either by gravity or pneumatically and comprising, a hopper structure having sides funneling downwardly to a bottom discharge opening, a generally rectangular gate slidable back and forth within a slotted opening communicating with the discharge opening, a supporting frame extending downwardly from the gate on which the gate is supported for sliding movement, a bottom cover beneath the gate forming with the frame and gate an enclosed space in the closed position of the gate into which material moves upon opening of the gate, an elongate pneumatic discharge conduit extending beneath the gate in a direction generally transversely of the sliding movement of the gate for substantially the entire length of the gate, said gate being movable in a direction away from the longitudinal axis of the conduit when moved to closed position and movable in a direction toward the longitudinal axis of the conduit when moved to open position, said bottom cover carrying an upper gas permeable member and a plenum chamber beneath the gas permeable member whereby air may pass through the gas permeable surface into the finely-divided material to aerate the material being pneumatically unloaded, and means permitting movement of said bottom cover to an inoperative position removed from beneath the gravity gate to allow a gravity discharge of material upon opening of the gate.

8. Apparatus for selectively unloading finely-divided material either by gravity or pneumatically as set forth in claim 7 wherein said elongate conduit extends generally along one side of said frame generally beneath the slotted opening and is fixed to the frame.

9. Apparatus for selectively unloading finely-divided material either by gravity or pneumatically as set forth in claim 7 wherein said elongate conduit is carried by said cover and for pneumatic unloading extends in a direction along the length of the gate and generally adjacent the side of said frame beneath the slotted opening.

10. In a railway covered hopper car for selectively unloading finely-divided particles either by gravity or pneumatically, a plurality of bottom outlet structures arranged centrally of the width of the car, each outlet structure having a bottom discharge opening, a generally rectangular gate mounted for sliding movement in a generally horizontal plane between open and closed positions relative to the discharge opening, a generally rectangular housing beneath said gate having an inner surface forming a continuation of said bottom discharge opening, a bottom cover adjacent the bottom of said housing extending in a generally horizontal plane, means to slide the gate unidirectionally from one side of said generally rectangular frame over which side the gate moves between open and closed positions, the gate moving toward said one side when being opened and moving away from said one side when being closed, said gate and bottom cover being in a generally parallel relation to each other and forming when the gate is between open and closed positions a pneumatic discharge chamber therebetween having a generally uniform cross-sectional area, an elongate pneumatic discharge conduit communicating with the discharge chamber extending beneath the gate in a direction generally transversely of the sliding movement of the gate for substantially the entire length of the gate, said bottom cover carrying an upper gas permeable member over substantially its entire upper surface and having a plenum chamber beneath the gas permeable member whereby gas may flow from the plenum chamber through the gas permeable member to fluidize the finely-divided particles adjacent the upper surface of the gas permeable member for transport to the pneumatic discharge conduit in a uniform conveying action, said gate being moved at least to a partially open position for pneumatic unloading with the exposed edge of the gate forming an entrance restriction to the discharge chamber between the gate and bottom cover whereby a major portion of the particles is unloaded leaving only a relatively small amount of particles within the outlet structure, said gate after the major portion of the particles is unloaded being moved across substantially the entire width of the bottom cover with a relatively high velocity airstream at the restriction when a pressure differential exists between the conduit and the interior of the outlet structure, the high velocity airstream moving across the bottom cover as the gate is moved with the restriction being of a generally uniform cross-sectional area during the entire traversing movement of the gate thereby to remove substantially all the particles remaining within the outlet structure, and means permitting movement of said bottom cover to an inoperative position removed from beneath the gravity gate to permit a gravity discharge of particles upon opening of the gate.

11. In a railway covered hopper car as set forth in claim 10, said cover being removably secured to said outlet structure and adapted to be removed from the outlet structure after the pneumatic unloading of the finely-divided particles.

12. In a railway covered hopper car as set forth in claim 11, said elongate discharge conduit being carried by said cover and extending in a direction along the length of the gate generally adjacent the side of said rectangular housing over which the gate moves between open and closed positions.

13. In a covered hopper railway car as set forth in claim 10, a rod extending transversely of the railway car on which the cover is mounted for movement between open and closed positions relative to the bottom discharge opening, means suspending the rod and cover from the outlet structure for movement between open and closed positions, said rod being hollow and in fluid communication with said plenum chamber whereby an air source may be connected to said rod for supplying air to said plenum chamber, and a removable cap adjacent each end of said hollow rod to permit selective connection of an air source from either side of the railway car.

14. A hopper structure adapted to pneumatically unload finely-divided material comprising, a plurality of downward funneling surfaces leading to a bottom discharge opening, a generally rectangular gate mounted for sliding movement in a generally horizontal plane between open and closed positions relative to the discharge opening, a generally rectangular housing beneath said gate having an inner surface forming a continuation of said bottom discharge opening, a bottom cover beneath said housing, means to slide the gate from one side of said generally rectangular frame over which the gate moves between open and closed positions, the gate moving toward said one side when being opened and moving away from said one side when being closed, said gate and bottom cover being in a generally parallel relation to each other and forming when the gate is between open and closed positions a pneumatic discharge chamber therebetween having a generally uniform cross-sectional area, and an elongate pneumatic discharge conduit communicating with the discharge chamber extending beneath the gate in a direction generally transversely of the sliding movement of the gate for substantially the entire length of the gate, said bottom cover carrying an upper gas permeable member and having a plenum chamber beneath the gas permeable member whereby gas may flow from the plenum chamber through the gas permeable member to fluidize the finely-divided material adjacent the upper surface of the gas permeable member for transport to the pneumatic discharge conduit in a uniform conveying action, said pneumatic discharge conduit being of a generally rectangular cross section to form said one side of the generally rectangular frame over which the gate moves between open and closed positions, said conduit having an upper horizontal section on which said gate is supported and an integral vertical section adjacent the pneumatic discharge chamber to define a portion of the discharge chamber, and at least one slot in said conduit forming a material passageway from the discharge chamber to the discharge conduit, said slot having a horizontal portion thereof defined by said horizontal section and a vertical portion thereof defined by said vertical section, said gate when fully open uncovering the horizontal portion of said slot to increase the effective size of the slot for pneumatic discharge.

References Cited

UNITED STATES PATENTS

| | | | |
|---|---|---|---|
| 2,418,302 | 4/1947 | Hornbrook | 302—52 |
| 2,874,999 | 2/1959 | Lofgren | 302—29 |
| 3,248,026 | 4/1966 | Kemp | 222—54.5 |

ANDRES H. NIELSEN, *Primary Examiner.*